Figure 1:
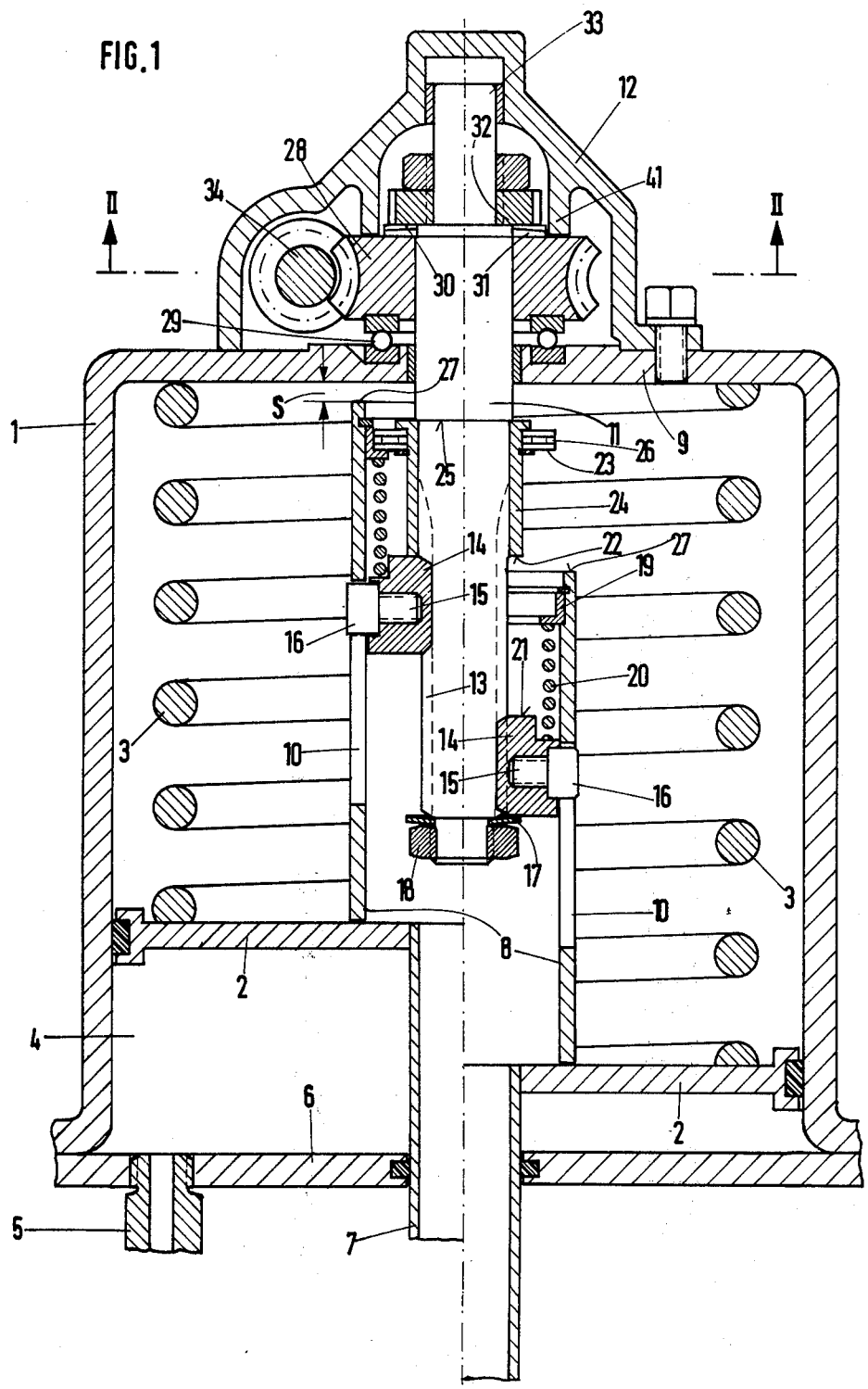

United States Patent [19]

Wosegien

[11] 3,955,480
[45] May 11, 1976

[54] SPRING-LOADED BRAKE CYLINDER FOR AN AIR BRAKE SYSTEM OF A RAILWAY VEHICLE

[75] Inventor: Bernd Wosegien, Munich, Germany

[73] Assignee: Knorr-Bremse GmbH, Munich, Germany

[22] Filed: Sept. 25, 1974

[21] Appl. No.: 509,035

[30] Foreign Application Priority Data
Dec. 1, 1973 Germany............................ 2359967

[52] U.S. Cl.............................. 92/130 R; 188/170; 303/6 M
[51] Int. Cl.² ......................................... F01B 31/00
[58] Field of Search ................ 92/130, 63; 188/170; 303/6 M

[56] References Cited
UNITED STATES PATENTS

| | | | |
|---|---|---|---|
| 3,101,219 | 8/1963 | Herrera.................................. | 92/63 |
| 3,136,227 | 6/1964 | Williams............................. | 92/130 |
| 3,282,169 | 11/1966 | Leighton................................. | 92/63 |
| 3,462,986 | 8/1969 | Cox, Jr. et al........................ | 92/130 |

*Primary Examiner*—Paul E. Maslousky
*Attorney, Agent, or Firm*—Edmund M. Jaskiewicz

[57] ABSTRACT

A spring-loaded brake cylinder has a piston therein one side of which is loaded by a spring and the other side of which is subjected to compressed air introduced into the cylinder. The cylinder is provided with an auxiliary release device comprising a screw coupling having a first coupling member which is rotatable and supported axially on a portion of the cylinder and a second coupling member threadedly engaged with the first coupling member and acting upon the brake cylinder through an abutment coupling against the force of the load spring. A coupling comprising mutually engaged toothed radial surfaces is provided between a collar attached to the first coupling member and a selectively rotatable worm wheel mounted adjacent the first coupling member. This coupling is engaged only when the pressure acting against the piston is below a predetermined value.

7 Claims, 2 Drawing Figures

SPRING-LOADED BRAKE CYLINDER FOR AN AIR BRAKE SYSTEM OF A RAILWAY VEHICLE

The present invention relates to a spring-loaded brake cylinder for use in an air braking system for railway vehicles, more particularly, to the auxiliary release device on such a brake cylinder.

Railway vehicle air braking systems have been provided with spring-loaded brake cylinders wherein a pressure medium is introduced into the cylinder to act against one side of the piston to hold the piston in the brake release position against a loading force exerted by a load spring. The brake can be readily applied by exhausting the pressure medium from the chamber and the force of the load spring will move the piston and the brake which is attached to the piston through the piston rod into the braking position. Such a brake cylinder is known from the German printed application No. 1,203,141.

If the system leading to the pressure source should develope a defect there may be a loss in pressure such that the pressure medium will also escape from the cylinder of the spring-loaded brake cylinder. As a result, the spring will become released and the brake will be actuated into the braking position. If it should become necessary to release the brake in the absence of a pressure medium, such as for shunting or towing the vehicle, a first screw coupling member which is mounted axially against a portion of the cylinder can be turned with a suitable tool so that a second coupling member of the screw coupling is displaced axially with respect to the first coupling member. In this manner, the piston can be moved to its release position against the force of the load spring.

Such spring-loaded brake cylinders have the substantial disadvantage in that it is necessary to screw the screw coupling members back into their coupled position subsequently to the elimination of the defect affecting the source of pressure medium. If such a screwing back should be inadvertently overlooked, such as by error, the spring-loaded cylinder and the brake to which it is attached are inoperable even though the braking system is now ready for operation. This is a dangerous situation since it may readily lead to serious accidents.

Other forms of such spring-loaded brake cylinders as disclosed in the German utility model Pat. No. 1,953,491 or German published Pat. No. 2,209,570 are provided with a piston rod which is rigidly connected to the spring-loaded piston by a locking device or a bayonet catch. The piston rod may be disconnected from the piston by selectively releasing the locking device or bayonet catch so that the piston rod is free to move axially with respect to the piston and the force of the load spring no longer acts upon the piston rod and thus upon the brake. When compressed air is again introduced into the cylinder chamber of this spring-loaded cylinder the piston will again be displaced in the opposite direction toward the piston rod and the rigid connection between the piston and the piston rod will again be automatically established. The above mentioned risk of accident is largely eliminated in such a brake device. However, once the brake having such a spring-loaded cylinder is released in the absence of pressure from the source of pressure medium, the brake cannot be applied again. Thus, should a vehicle be shunted to a new position the vehicle cannot be braked in this new position. Because of this rather substantial disadvantage such spring-loaded brake cylinders have not been widely used.

The German published application No. 2,160,893 discloses another form of a spring-loaded brake cylinder in which an additional manually operated pressure medium pump is connected to the cylinder chamber. Should a failure or a defect occur in the main source of pressure medium, the spring-loaded cylinder may be actuated into its release position by the manually operated pump. The main source of pressure medium is automatically disconnected from the cylinder chamber by means of suitable valves upon a failure of pressure and when the pressure from the main source of pressure medium returns the source of pressure is again automatically connected to the cylinder chamber. The additional valves required for this type of spring-loaded brake cylinder substantially increase the cost of manufacture and the cost of installation and further require additional space for the installation of the brake cylinder which space is frequently not available. In addition, the manual operation of the auxiliary pump is not satisfactory.

In an attempt to avoid the above described disadvantages, it has been proposed to provide a spring-loaded cylinder of the general type referred to above wherein the screw joint is provided with a reversible thread and the second coupling member is loaded by a force acting in the direction of loading of the load spring at least on the action of pressure medium within the cylinder chamber. There is further provided a coupling device which secures the second coupling member against rotation when the cylinder chamber is at least approximately free of pressure. The first coupling member comprises a threaded shaft and the second coupling member comprises a nut threaded upon the shaft so as to be axially displaceable thereon. The coupling device comprises a tubular member which engages spring-loaded ball detents in a radial direction and, upon the return of pressure into the chamber from the source of pressure medium releases the nut from the spindle so that the nut automatically returns into its initial position.

The operation of this spring-loaded cylinder is safe and reliable. However, this cylinder is characterized by many separate mechanical components, such as the radially positioned small pipes having internal flanges in which are seated the spring urged ball detents, the springs for the ball detents, a conical indentation for the friction coupling of the nut on the shaft and several other components all of which contribute to making such a cylinder relatively expensive in manufacture and installation and complicating service and maintenance procedures.

It is therefore the principal object of the present invention to provide a novel and improved spring-loaded brake cylinder for an air braking system of a railway vehicle.

It is another object of the present invention to provide a novel and improved auxiliary release device for such a springloaded brake cylinder.

It is a further object of the present invention to provide such a spring-loaded brake cylinder which eliminates or overcomes the disadvantages of known spring-loaded brake cylinders but incorporates the advantages thereof in such a manner so as to minimize costs of construction, installation and maintenance.

According to one aspect of the present invention, a spring-loaded brake cylinder for an air brake system of a railway vehicle may comprise a piston and a first spring which acts on one side of the piston to load the piston. The other side of the piston is subjected to a pressure medium which is introduced into the cylinder chamber from a pressure source. There is a first screw coupling which comprises a first coupling member having a reversible thread thereon and a second coupling member. The first coupling member is rotatably mounted within the cylinder and supported axially against a portion of the cylinder housing. The second coupling member is non-rotatable but mounted for axial displacement with respect to the first coupling member. First friction coupling means are provided to couple the second coupling member to the piston against the force of the load spring. A second spring acts upon the second coupling member in the same direction that the first spring loads the piston. Second coupling means are provided for coupling the first coupling member to a selectively rotatable member mounted adjacent the first coupling member and this coupling is engaged only when the pressure acting upon the piston is below a predetermined value, or the cylinder chamber has substantially no pressure therein.

This particular arrangement wherein the second coupling means on the one hand prevents rotation of the first coupling member when the rotatable member is not actuated and, on the other hand enables operation of the rotatable member to be transmitted to the first coupling member results in a simplified structure for a spring-loaded cylinder which is capable of safe and reliable operation.

Figure 2:
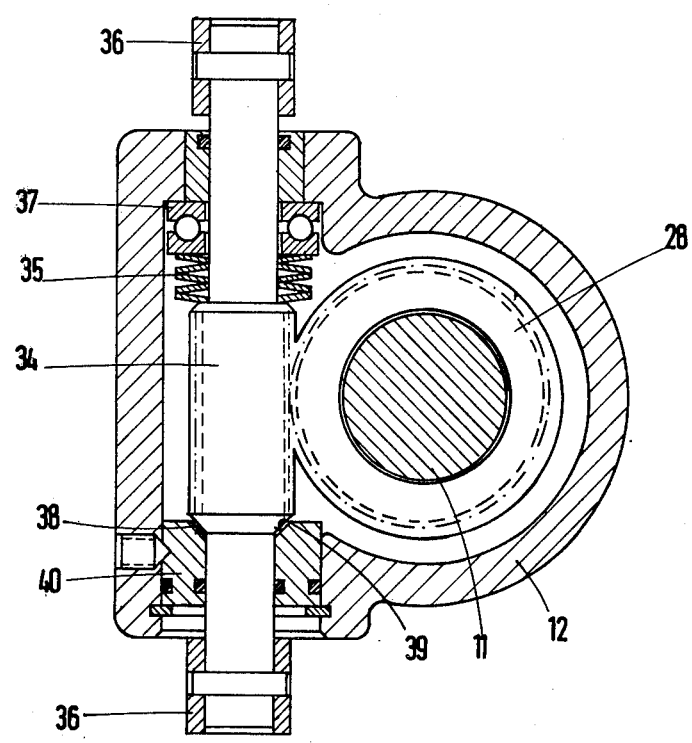

Other objects and advantages of the present invention will be apparent upon reference to the accompanying description when taken in conjunction with the following drawings, which are exemplary, wherein;

FIG. 1 is a longitudinal sectional view of a spring-loaded brake cylinder according to the present invention; the left side of the drawing showing the components in the release position subsequent to the actuation of the auxiliary release device and the right side of the drawings showing the parts in the braking position while the auxiliary release device is not actuated; and FIG. 2 is a sectional view taken along the line II—II of FIG. 1.

Proceeding next to the drawings wherein like reference symbols indicate the same parts throughout the various views a specific embodiment and modification of the present invention will be described in detail.

As may be seen in FIG. 1, the spring-loaded brake cylinder of the present invention includes a cylinder housing 1 within which a piston 2 is sealingly mounted for axial displacement therein. One side of the piston 2 is acted upon by a load spring 3 and the other side of the piston is acted upon by pressure in a cylinder chamber 4 into which a pressure medium, such as compressed air, is introduced through a pipe connection 5.

A piston rod 7 extends from the piston 2 through the cylinder chamber 4 and outwardly of the cylinder through the cover plate 6 within which the piston rod is suitably sealed. At the other end of the piston rod which is not shown in the drawing there are provided suitable connections to pivoted levers, brakes or other devices that are to be actuated by the spring-loaded cylinder and similarly are not shown in the drawing.

Attached on the side of the piston 2 away from piston rod 7 is a tubular member 8 which is disposed within the load spring 3. In the release position of the cylinder, the tubular member 8 extends almost to the bottom 9 of the cylinder housing. The bottom 9 also supports the other end of the load spring 3. The wall of the tubular member 8 us provided with one or more longitudinal slots 10.

A threaded shaft 11 is rotatably mounted in the bottom 9 of the cylinder housing so as to be co-axial to the tubular member 8 and is also mounted for limited axial displacement. One end of the shaft extends into the tubular member 8 and the other end extends into a gearing housing 12 attached to the bottom wall 9 of the cylinder. The inner diameter of the tubular member 8 is greater than the diameter of the shaft 11. The shaft 11 is provided with a reversible external thread 13 on its end which is adjacent the tubular member 8 and this threaded portion 13 extends into the tubular member. A nut 14 is threaded upon the threaded portion 13 and is guided with very small clearance in the tubular member 8. The pin 14 is provided with one or more radially extending pins 15 which are slidably received within the longitudinal slots 10. The pins 15 are provided with suitable sliding heads 16 to guide the nut 14 in such a manner that the nut is capable of axial displacement but is retained against rotation.

The screw coupling between shaft 11 and nut 14 is reversible such that the nut 14 is moveable in either direction along the shaft.

On the threaded end of shaft 11 there is an abutment disk 17 secured in position by a nut 18 and prevents the screwing of nut 14 from the shaft 11. The end of the tubular member 8 facing toward the cylinder bottom 9 is provided with a radial inwardly projecting flange 19 engaged by one end of a spring 20 whose other end rests upon nut 14. The spring 20 is relatively weak in force in comparison to load spring 3.

A pipe or tubular section 24 is attached to the shaft 11 in the vicinity of the cylinder bottom 9 to form a stop 22 engageable by surface 21 on the nut 14. Also mounted on the pipe section 24 is an abutment coupling 23 which is engageable by flange 19. A shoulder 25 on shaft 11 secures the pipe section 24 against axial diaplacement on shaft 11 towards cylinder bottom 9. The friction coupling 23 comprises a rotary thrust bearing 26 mounted on the pipe section 24. These components are so dimensioned and mounted that during screwing of the nut 14 on shaft 11 in the direction toward the cylinder bottom 9, the face 21 will contact stop 22 immediately prior to the flange 19 contacting friction coupling 23 and when the heads 16 contact the ends of the slots 10 away from the piston 2. When the piston 2 is loaded predominantly by the force of load spring 3, end edge 27 of the tubular member 8 will be spaced from cylinder bottom 9 at a distance S which distance corresponds to the distance required for engagement or disengagement of a coupling device to be presently described.

In the gear housing 12, a worm wheel 28 is freely rotatably mounted on a cylindrical section of the shaft 11. One face of the worm wheel 28 engages a thrust bearing 29 resting upon cylinder bottom 9 and its other face within a annular zone immediately surrounding shaft 11 has a plurality of axially projecting radially oriented teeth 30. The teeth 30 are engageable with corresponding teeth 31 on a collar 32 rigidly attached to the shaft 11. The interior of the housing 12 is provided with an annular extension 41 which prevents displacement of the worm wheel 28 in a direction which would remove the worm wheel from the shaft. This direction is away from the cylinder bottom 9.

The end of shaft 11 indicated at 33 is rotatably mounted in a suitable bearing portion in the housing 12 and is so mounted that the shaft 11 is axially displaceable through a limited distance S.

Worm wheel 28 meshes with a worm gear 34 as shown in FIG. 2 and which is rotatably mounted in the housing 12 so as to be capable of limited axial displacement against the force of a plate spring 35. Both ends of the worm 34 project outwardly from the housing 12 and on each of these ends there are provided an actuating part 36 in the form of a hexagonal head which enables the worm 34 to be rotated as desired by means of a suitable tool. The plate spring 35 bears against housing 12 by means of a thrust bearing 37 so as to urge a conical surface portion 38 on worm 34 into a corresponding conical recess 39 formed in an insert 40 attached to the housing 12 and retained against rotation and axial displacement. The corresponding conical surfaces 38 and 39 form a friction clutch or coupling member loaded by spring 35 and this coupling prevents rotation of worm 34 in a direction of rotation as to be presently described.

The right side of FIG. 1, shows the components of the spring-loaded cylinder in the braking position and ready for operation. There is no pressure in the cylinder chamber 4 and the load spring 3 presses piston 2 into a position adjacent cover plate 6. The piston rod 7 projects outwardly at its maximum distance from the cylinder housing 1. The nut 14 is located at the end of shaft 11 in contact with stop disk 17 and the pin means 15,16 are positioned so that the heads 16 are almost at the ends of the slots 10 that are away from the piston 2. Spring 20 is compressed and there is a distance corresponding to the working stroke of the cylinder between flange 19 and abutment coupling 23 as well as between face 21 and stop 22. The end edge 27 is spaced from cylinder bottom 9 at a distance which is greater than the working stroke of the cylinder by a distance S. The spring 20 thus acts through nut 14 to load shaft 11 in the direction toward piston 2 and, as a result, coupling element 32 is coupled with coupling element 30 on worm wheel 28 which is supported against axial displacement by means of the thrust bearing 29. The coupling device 30,31 is now engaged.

When a pressure medium is introduced into the cylinder chamber 4 through the pipe connection 5, the piston 2 will be displaced in the direction of cylinder bottom 9 against the force of load spring 3. Accordingly, the piston rod 7 will be partially drawn into the cylinder housing 1. The tubular member 8 will then slide past the nut 14 which will retain its position. Flange 19 on tubular member 8 will contact the abutment coupling 23 and, during the residual stroke of the piston 2, which corresponds to the distance S, the shaft 11 together with nut 14 and collar 32 will be carried along against the force of spring 20 by means of the rotary thrust bearing 26 and the pipe section 24. Since the gear housing annular extension 41 will retain the worm wheel 28 in position, the coupling device 30,31 will be disengaged as the collar 32 is separated from worm wheel 28. In the release end position which can be attained by the action of pressure medium on piston 2, the front edge 27 of the tubular member 8 will contact cylinder bottom 9.

In order to return the spring-loaded cylinder to its working position, the pressure medium is evacuated from cylinder chamber 4 through the pipe connection 5. The load spring 3 will then push the piston 2 back into the position shown on the right hand side of FIG. 1 and all of the other components of the cylinder will again assume their positions as shown on the right side of FIG. 1.

In the event the cylinder chamber 4 is evacuated because of a defect in the supply of pressure medium connected to pipe connection 5, the piston 2 can be moved against the force of load spring 3 into the position wherein the cylinder is released by operation of an auxiliary device in a manner to be presently described.

Commencing from the position of the components on the right side of FIG. 1, the worm 34 is turned by means of applying a suitable tool to one of the hexagonal heads 36. The worm 34 is turned in such a direction that by means of the worm wheel 28 and coupling device 30,31 engaged under the action of spring 20, the shaft 11 is rotated in a direction so as to screw the nut 14 toward the bottom wall 9. The pitch of the thread of worm 34 and the lead of the thread between shaft 11 and nut 14 are so selected that under the force of reaction exerted by worm wheel 28 on worm 34, the worm 34 is axially displaced in a direction to disengage the conical friction clutch 38,39 against the force of plate spring 35 which, bears against a wall of the gearing housing 12 through the rotable thrust bearing 37. After the nut 14 has been screwed along the shaft 11 for a short distance, the heads 16 of pins 15 will abut against the ends of the longitudinal slots 10 closest to cylinder bottom 9. Further screwing of the nut 14 along shaft 11 will cause the heads 16 to carry along the tubular member 8 and, accordingly, the piston 2 connected therewith. The spring 3 loads coupling device 30,31 through nut 14 and shaft 11 as well as collar 32 in the direction to engage the coupling device. As a result, there is no danger of an accidental or inadvertent opening of the coupling device 30,31.

The force of load spring 3 is transmitted through worm wheel 28 through thrust bearing 29 back to cylinder bottom 9 the other side of which supports load spring 3. The friction of the packing of piston 2 with the wall of the cylinder as well as the force exerted by load spring 3 will prevent almost completely any rotation of the piston 2 with the tubular member 8 and thus also the nut 14 because of the pins 15. During this screwing back of the nut 14 when the tubular member edge 27 is spaced a distance of S from cylinder bottom 9, the face 21 of nut 14 will contact stop 22 and flange 19 will face friction coupling 23 at most with a very small play. The piston is now positioned in a release position and the emergency release operation is now completed.

After this screwing back of the nut 14 and the tool is released from the actuating ends 36, the irreversibility of worm gear 34,28 together with the engagement of conical friction clutch 38,39 under the force of spring 35 prevents an accidental automatic turning back of shaft 11 and accordingly a screwing back of nut 14. Thus, the emergency release position of the spring-loaded cylinder will exist even after worm 34 has been released. Every component of the spring-loaded cylinder will then be in the position shown on the left side of FIG. 1.

It is therefore apparent that the vehicle whose brake system is equipped with the spring-loaded cylinder of the present invention and in which the brake has been released by the auxiliary release device, can be moved for any purpose even after the supply of pressure medium has failed. After moving of the vehicle has been completed, the stopped vehicle can again be braked even though there may be a continuous failure of the supply of pressure medium. This braking is accomplished by turning the worm 34 and accordingly worm wheel 28, coupling device 30,31 and shaft 11 in the opposite direction as compared to the direction with the above described auxiliary release procedure. The cylinder will then attain its operating position shown in the right side of FIG. 1 wherein the piston rod 7 and elements of the brake rigging connected thereto are loaded by spring 3 acting upon piston 2.

The situation may occur that when the spring-loaded cylinder is in the auxiliary release position as shown in the left side of FIG. 1 the cylinder chamber 4 will again be subjected to the action of pressure medium after the defect or failure in the supply of pressure medium has been remedied. When this occurs, the piston 2 together with tubular member 8 will be displaced towards cylinder bottom 9 until the front edge 27 of tubular member 8 contacts bottom 9. This will occur after there is sufficient pressure in the chamber 4 to overcome the load exerted by spring 3. The flange 19 will contact friction coupling 23 and through the action of rotary thrust bearing 26 and pipe section 24 the shaft 11 and the collar 32 will be carried along a distance S. As a result, coupling surfaces 31,32 will be disengaged since the worm wheel 28 is prevented from any movement because of its contact with the annular extension 41. The nut 14 which up to this time has still been in contact with stop 22 will be shifted by spring 20 toward disk 17 and this will cause a rotation of shaft 11 because of the reversible thread connection between the shaft 11 and the nut 14. The axial force exerted by spring 20 through nut 14 on shaft 11 is transmitted through the rotary thrust bearing 26 on flange 19. Because of the rotary thrust bearing, there is a ready rotation of the shaft 11. The worm wheel 28 will remain stationary during this step. As soon as nut 14 is screwed back into contact with disk 17, a release position full operational readiness of the spring-loaded cylinder is again attained. Further, this position is attained without the necessity of performing any additional manipulations or operations to change the auxiliary release position into the normal release position. The spring-loaded cylinder can then be brought into its operating position as shown on the right side of FIG. 1 merely by evacuating cylinder chamber 14.

As a modification, under certain circumstances it may be desirable to guide the piston 2, tubular member 8 and nut 14 through a structure which would prevent any rotation. Such structure may include a second tubular member surrounding tubular member 8 and the second tubular member may be fastened against rotation on cylinder bottom 9. The second tubular member may also be provided with longitudinal slots to accommodate the heads 16 of the radial pins 15.

As a further modification of the above described embodiment, the functions of the shaft 11 and nut 14 may be interchanged with a corresponding change in the separate components of the spring-loaded cylinder. The shaft can then be coupled to the piston 2 and the nut can be driven by the worm wheel 28.

Thus it can be seen that the present invention has provided a spring-loaded cylinder for an air brake system of a railway vehicle which is simple in structure and reliable in operation. The cylinder incorporates an auxiliary release device which will permit auxiliary or emergency release of the cylinder even should the supply of pressure medium fail. The auxiliary release device also provides for braking of the vehicle in the continued absence of the supply of pressure medium.

It will be understood that this invention is susceptible to modification in order to adapt it to different usages and conditions, and accordingly, it is desired to comprehend such modifications within this invention as may fall within the scope of appended claims.

What is claimed is:

1. A spring-loaded brake cylinder for an airbrake system of a railway vehicle and having an auxiliary release device, comprising a cylinder having a piston therein and a first spring acting on one side of the piston to load the same and the other side of the piston being subjected to a pressure medium introduced into the cylinder, a first screw coupling comprising first and second coupling members, said first coupling member comprising a threaded shaft having a reversible thread thereon rotatably mounted within said cylinder and supported axially against a portion of the cylinder, said second coupling member comprising a nut threaded upon said shaft, said nut having a pin radially extending therefrom, a tubular member attached to said piston and surrounding said nut, said tubular member having a longitudinal slot therein receiving said pin to non-rotatably mount said nut for axial displacement with respect to said first coupling member, first friction coupling means at the end of said tubular member away from said piston for coupling said second coupling member to said piston against the force of said first spring when a pressure medium acts upon said other side of the piston, an actuation device mounted on the exterior of said cylinder and comprising a rotatable member mounted on said threaded shaft and means for selectively rotating said rotatable member to define the auxiliary release device, second coupling means actuated by axial displacement of said threaded shaft for coupling said threaded shaft to said rotatable member only when the pressure acting against said piston is below a predetermined value, and a second spring between said tubular member end and said second coupling member acting upon said second coupling member in the same direction that said first spring loads said piston and in the direction to displace axially said first coupling member to engage said second coupling means.

2. In a spring-loaded brake cylinder as claimed in claim 1 and stop means on said threaded shaft engageable by said nut in the release direction of the piston at a distance in front of the release end position of the piston at least corresponding to the disengagement distance of said second coupling means.

3. In a spring-loaded brake cylinder as claimed in claim 1 wherein said rotatable member comprises a worm wheel freely rotatably mounted on said shaft, said selectively rotating means comprising a selectively operable worm gear having an irreversible thread meshing with said worm wheel, said worm wheel having one face bearing against a portion of said cylinder, said worm wheel being secured against rotation when its other face is engaged by said second coupling means.

4. In a spring-loaded brake cylinder as claimed in claim 3 and a collar attached to said shaft, said second coupling means comprising mutually engaging toothed radial surfaces on said worm wheel and on said collar.

5. In a spring-loaded brake cylinder as claimed in claim 3 wherein said worm gear has limited axial displacement, a housing attached to said cylinder and enclosing said worm gear, a second friction coupling on said worm gear to couple said worm gear with a portion of said housing, and spring means for retaining said second friction coupling in engagement.

6. In a spring-loaded brake cylinder as claimed in claim 5 wherein said first spring acts upon said piston and shaft to urge said second friction coupling into disengagement.

7. In a spring-loaded brake cylinder as claimed in claim 1 wherein said first friction coupling means comprises a rotary thrust bearing.

* * * * *